(12) United States Patent
Tyvoll et al.

(10) Patent No.: US 6,783,580 B2
(45) Date of Patent: *Aug. 31, 2004

(54) ENVIRONMENTALLY FRIENDLY, RELIABLE, FAST DRYING INK FOR POINT-OF-SALE THERMAL INK JET APPLICATION

(75) Inventors: David A. Tyvoll, La Jolla, CA (US); Xiaoche Chen, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

This patent is subject to a terminal disclaimer.

(21) Appl. No.: 10/077,092

(22) Filed: Feb. 15, 2002

(65) Prior Publication Data

US 2002/0112643 A1 Aug. 22, 2002

Related U.S. Application Data

(63) Continuation-in-part of application No. 09/946,460, filed on Sep. 4, 2001, now Pat. No. 6,648,951, and a continuation-in-part of application No. 09/539,247, filed on Mar. 30, 2000, now abandoned.

(51) Int. Cl.$^7$ .............................................. C09Q 11/02
(52) U.S. Cl. ................ 106/31.47; 106/31.43; 106/31.58
(58) Field of Search .................. 106/31.47, 31.43, 106/31.58

(56) References Cited

U.S. PATENT DOCUMENTS

| | | | |
|---|---|---|---|
| 4,500,895 A | 2/1985 | Buck et al. | 346/140 R |
| 4,509,062 A | 4/1985 | Low et al. | 346/140 R |
| 4,685,968 A | 8/1987 | Palmer | 106/23 |
| 4,761,180 A | 8/1988 | Askeland et al. | 106/22 |
| 4,786,327 A | 11/1988 | Wenzel et al. | 106/22 |
| 4,809,428 A | 3/1989 | Aden et al. | 29/611 |
| 4,810,292 A | 3/1989 | Palmer et al. | 106/23 |
| 5,580,372 A | 12/1996 | Gino et al. | 106/20 R |
| 5,769,930 A | 6/1998 | Sano et al. | 106/31.36 |
| 5,788,754 A | 8/1998 | Deardurff et al. | 106/31.58 |
| 5,851,273 A | 12/1998 | Morris et al. | 106/31.27 |
| 5,858,075 A | 1/1999 | Deardurff et al. | 106/31.27 |
| 5,876,491 A | 3/1999 | Gunn et al. | 106/31.46 |
| 6,019,827 A | 2/2000 | Wickramanayake et al. | 106/31.25 |
| 2002/0007765 A1 * | 1/2002 | Sano et al. | 106/31.49 |
| 2002/0078858 A1 * | 6/2002 | Chen et al. | 106/31.47 |

FOREIGN PATENT DOCUMENTS

GB          2283208 A  *  5/1995  ............ B41J/02/16

OTHER PUBLICATIONS

Hewlett–Packard Journal, pp. 4–37 (May 1985).
Hewlett–Packard Journal, pp. 6–56 (Aug. 1988).
Hewlett–Packard Journal, pp. 51–98 (Oct. 1988).
Hewlett–Packard Journal, pp. 64–102 (Aug. 1992).
Hewlett–Packard Journal, pp. 6–97 (Feb. 1994).

* cited by examiner

Primary Examiner—Mark L. Bell
Assistant Examiner—Veronica F. Faison

(57) ABSTRACT

An ink jet ink for thermal ink jet point-of-sale printers is provided, comprising: (a) a vehicle comprising (i) 5 to 10 wt % of a drying agent selected from the group consisting of 1,2-hexanediol and 1,2-pentanediol, (ii) 15 to 32 wt % 2-pyrrolidone, (iii) 15 to 37 wt % of at least one humectant, and (iv) the balance water; (b) 0.5 to 10 wt % of a water-soluble dye; and (c) 0 to 3 wt % comprising buffers, corrosion inhibitors, surfactants, biocides, polymers, pigments, and binders, with the proviso that the total amount of surfactants is 0.1 wt % or less, based on the total ink composition. In particular, the ink jet ink is employed in combination with a printhead having a nickel orifice plate through which droplets of the ink are expelled onto a print medium. The ink jet ink composition is environmentally friendly, reliable, and fast drying, on the order of 300 msec and less. Further, the ink composition exhibits minimal puddling on the nickel orifice plate, leading to improved print quality.

25 Claims, 2 Drawing Sheets

ENVIRONMENTALLY FRIENDLY, RELIABLE, FAST DRYING INK FOR POINT-OF-SALE THERMAL INK JET APPLICATION

CROSS-REFERENCE TO RELATED APPLICATION

The present application is a continuation-in-part application of both Ser. No. 09/539,247, filed Mar. 30, 2000, now abandoned and Ser. No. 09/946,460, filed Sep. 4, 2001, U.S. Pat. No. 6,648,951.

TECHNICAL FIELD

The present invention is directed generally to point-of-sale (POS) printers and, more particularly, to ink compositions that are environmentally friendly, reliable, and fast drying for use in thermal ink jet printers for POS applications and check validation.

BACKGROUND ART

Thermal inkjet printers are well-known and have been extensively discussed elsewhere; see, e.g., *Hewlett-Packard Journal*, pp. 4–37 (May 1985); *Hewlett-Packard Journal*, pp. 6–56 (August 1988); *Hewlett-Packard Journal*, pp. 51–98 (October 1988); *Hewlett-Packard Journal*, pp. 64–102 (August 1992); and *Hewlett-Packard Journal*, pp. 6–97 (February 1994). Essentially, thermal ink jet printers use printheads that employ resistive heater elements to heat ink to boiling and thus propel the ink through an overlying orifice plate during an ink jet printing operation. Thermal ink jet printers are known (1) for their relatively fast throughput, similar to that of many laser jet printers, (2) for their relative inexpensiveness, lower than that of laser jet printers; and (3) for their ease of use and ease of print cartridge replacement.

Point-of-sale applications involve a variety of equipment, such as cash registers, credit card receipt printers, and the like. The typical print engine is a dot matrix impact printer or a direct thermal printer. Compared to ink jet printers, the former is well-known for its relatively noisiness, while the latter requires special paper.

Expansion of the utility of ink jet printers into point-of-sale (POS) applications is desired, due to the many advantages that ink jet offers over dot matrix impact printers and direct thermal printers, in particular, being much quieter than the former and not requiring special paper and lack of permanence upon exposure to heat and light, as is true of the latter. In addition, ink jet enables the use of color, which is neither available with dot matrix impact printers nor with direct thermal printers. However, there are several criteria that have to be met in order for thermal ink jet printers to find use in such applications.

First, the ink jet printer must be able to print receipts rapidly, thereby requiring high frequency printing, on the order of about 3 kHz (text). Second, due to the fact that the printer is used in public places, low toxicity is a requirement; ink compositions must be environmentally benign and non-toxic. Third, a print cartridge must be capable of printing on the order of several million characters before requiring changing, in order to minimize frequent cartridge changes. Fourth, the pen portion of the print cartridge is not likely to be capped during non-use, which means that the ink must be capable of long term decap, on the order of weeks or months. (Decap, as used herein, describes the ability of the pen to remain clear of plugs of dried ink in the nozzles.) Fifth, the ink must be fast drying. Previous inks were considered fast drying if they achieved drying times of 10 to 15 seconds; the drying time in such applications was dictated by the mechanics of the printer's print speed and placing one printed page on top of another. In POS applications, however, the ink must dry nearly instantaneously, since upon completion of printing a receipt, it is immediately handed to the customer and therefore must not smudge the customer's fingers. A drying time of less than 300 milliseconds (msec) is required to meet this condition, more than 10 times faster than previous inks were required to achieve. Sixth, since the ink jet printer is used repeatedly in POS applications involving the public, all parts must be able to handle minimum servicing. Seventh, the print quality, which is on the order of 100 dots per inch (dpi) must be no worse than other printing technologies, such as dot matrix impact or direct thermal. Eighth, and finally, the resulting print must exhibit adequate optical density (OD), by which is meant that the OD must be at least 0.3 for readability (on paper).

The foregoing requirements suggest that a proven, mature technology be employed, in order to minimize printer downtime. That is to say, it is better to use an older, existing product that can be modified than to develop a new product that might take years to prove out.

A printhead that meets many of the foregoing requirements is disclosed and claimed in U.S. Pat. Nos. 4,809,428; 4,500,895; and 4,509,062. Such a printhead employs a nickel orifice plate in combination with a glass (silica) substrate.

There are inks, for example, that are relatively fast drying, but are not designed for high frequency printing. Further, a problem that exists with the nickel orifice plate is that the inks developed for the foregoing printhead tend to puddle on the orifice plate, which interferes with printing crisp, clean images and lowers the overall system reliability.

Thus, there is a need for an ink jet ink that can meet the foregoing requirements for POS applications, while avoiding most, if not all, of the disadvantages of previously-developed inks.

DISCLOSURE OF INVENTION

In accordance with the teachings herein, an ink jet ink for thermal ink jet point-of-sale printers is provided, comprising:
 (a) a vehicle comprising
  (i) 5 to 10 wt % of a drying agent selected from the group consisting of 1,2-hexanediol and 1,2-pentanediol and mixtures thereof,
  (ii) 15 to 32 wt % 2-pyrrolidone,
  (iii) 15 to 37 wt % of at least one humectant, and
  (iv) the balance water;
 (b) 0.5 to 10 wt % of a dye or dye mixture; and
 (c) 0 to 3% comprising at least one component selected from the group consisting of buffers, corrosion inhibitors, surfactants, biocides, polymers, pigments, and binders, with the proviso that the total amount of surfactants is 0.1 wt % or less, based on the total ink composition.

Further in accordance with the teachings herein, the ink jet ink is employed in combination with a printhead having a nickel orifice plate, through which droplets of the ink are expelled onto a print medium.

Additionally in accordance with the teachings herein, a method is provided for reducing puddling on the nickel orifice plate, comprising providing the foregoing composition and jetting it through orifice openings in the nickel orifice plate.

The ink jet ink composition is environmentally friendly, reliable, and fast drying, on the order of 300 msec and less.

Further, the ink composition exhibits minimal puddling on the nickel orifice plate, leading to improved print quality.

BEST MODES FOR CARRYING OUT THE INVENTION

Figure 1:
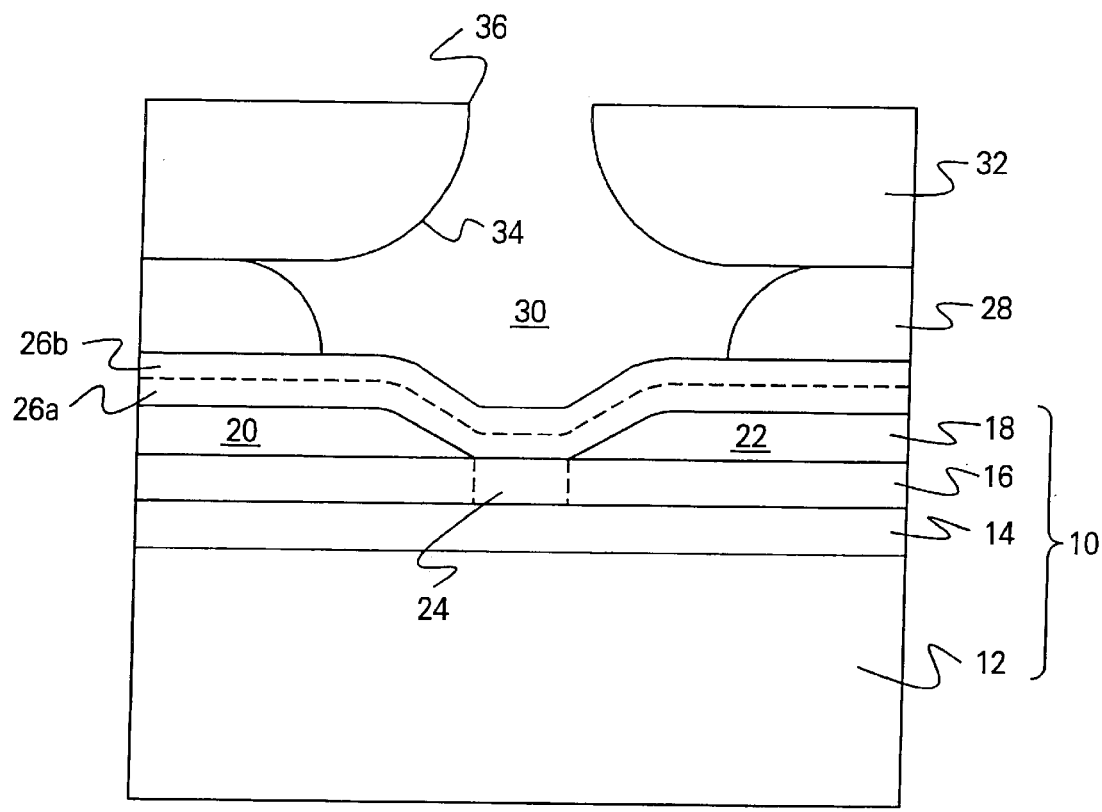
FIG. 1 is a side elevational view of a portion of a print chamber used in the practice of the teachings herein, in which ink is expelled through openings in an orifice plate.

An example of a portion of an ink jet printhead is depicted in FIG. 1. A thin film resistor sub-structure, designated generally as 10, includes an underlying substrate 12, which is typically glass or silicon. The substrate 12 has a layer 14, such as silicon dioxide, $SiO_2$, thereon, and this surface insulating layer 14 is utilized to provide a dielectric barrier and heat sink between the substrate 12 and an overlying resistive layer 16, which may, for example comprise a tantalum aluminum alloy, TiAl. The resistive layer 16 is in turn covered by a top conductive layer 18 which may, for example, comprise aluminum, Al. However, the conductive layer 18 and the resistive layer 16 may both comprise materials other than the exemplary materials listed above. Similarly, it is not necessary that the surface insulation layer 14 be used at all, and instead the resistive layer may be deposited directly on certain types of substrate materials with dielectric and heat transfer characteristics suitable for directly receiving the desired resistive material. One such suitable substrate material is baria glass.

The top conductive layer 18 is appropriately masked with strips of photoresist (not shown), using conventional photolithographic processing techniques and then exposed to a metal etchant to remove all unprotected regions of the aluminum conductive layer 18. This step leaves intact a plurality of conductive traces (two such are shown, denoted 20 and 22, although a typical printhead structure contains a large plurality of such traces), which define a resistor length dimension. These traces serve to define and supply current to a corresponding plurality of heater resistors 24 in the area indicated.

Additional processing steps are followed, which result in the formation of a conformal inert passivation layer 26a, such as silicon nitride, $Si_3N_4$, which is deposited on the surface of the aluminum trace material 18. Thereafter, an outer protective layer 26b of highly inert silicon carbide, SiC, is deposited on the surface of the $Si_3N_4$ to complete the composite inner surface passivation layer 26.

Then, a much thicker outer barrier layer 28 is formed on the surface of the surface passivation layer 26. The outer barrier layer 28 comprises either a polymer layer such as the well known polymers Riston and Vacrel, available from DuPont de Nemours Company (Wilmington, Del.) or electroformed nickel.

An ink reservoir region, or firing chamber, 30 is normally aligned with the previously formed resistive heater elements 24. The outer barrier layer 28 is in turn secured using a suitable adhesive (or using the outer barrier layer 28 as its own adhesive) to an outer orifice or nozzle plate 32 with orifice openings 36 defined using known orifice-forming techniques. These orifice openings 36 are typically defined by a plurality of convergent outer surfaces 34 which terminate at a corresponding plurality of output ink ejection orifice openings. The orifice plate 32 comprises nickel, preferably electroformed nickel, although the use of additional top coatings such as gold or palladium is practiced in the industry. Due to the high cost of the precious metal and the additional processing steps involved, however, this extra feature is not desirable.

The above-described nickel nozzle plate 32 and its associated resistor heater 24 and thin film structure 10 are described in greater detail in U.S. Pat. No. 4,809,428, the contents of which are incorporated herein by reference.

Figure 2:
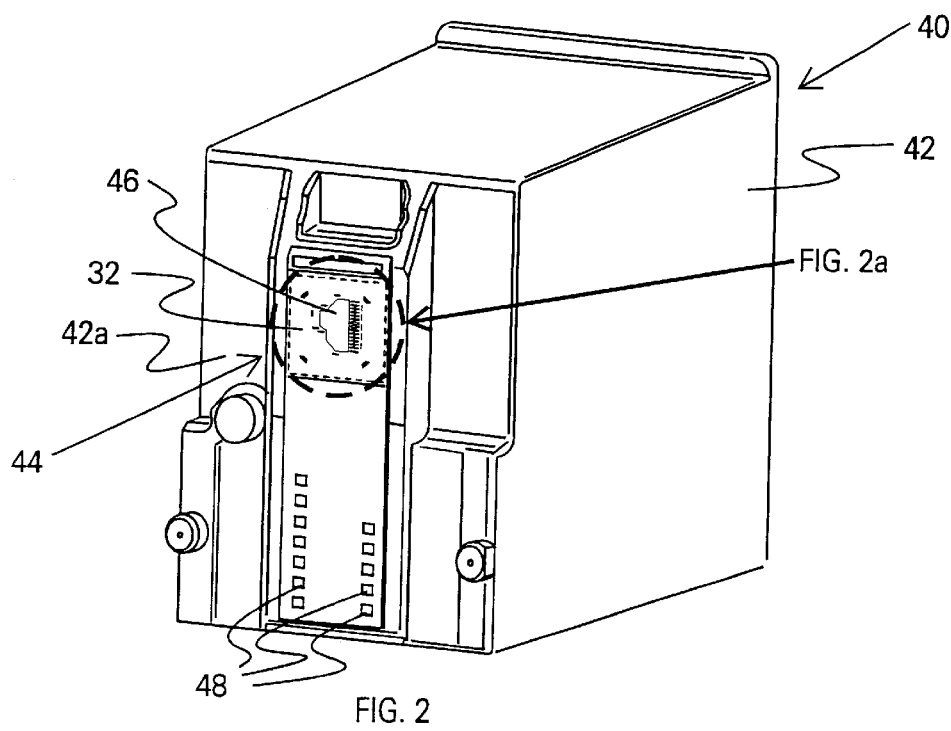
FIG. 2 is a perspective view of a print cartridge that incorporates the orifice plate of FIG. 1.

FIG. 2 is a perspective view of a print cartridge 40 comprising a housing 42 in which a reservoir of ink (not shown) is contained. A printhead 44 is formed on one side 42a of the housing 42 and comprises the orifice plate 32, a plurality of orifice openings 36 therein, and a manifold 46 for supplying ink to each firing chamber 30. Also formed on the surface 42a is the substrate 12, with a plurality of electrical interconnects 48 for making contact between the print cartridge 40 and a printer driver (not shown) in a printer (not shown). In operation, the print cartridge 40 is oriented so that the surface 42a is parallel to a print medium (not shown) and separated a short distance therefrom, as is well-known.

Figure 2A:
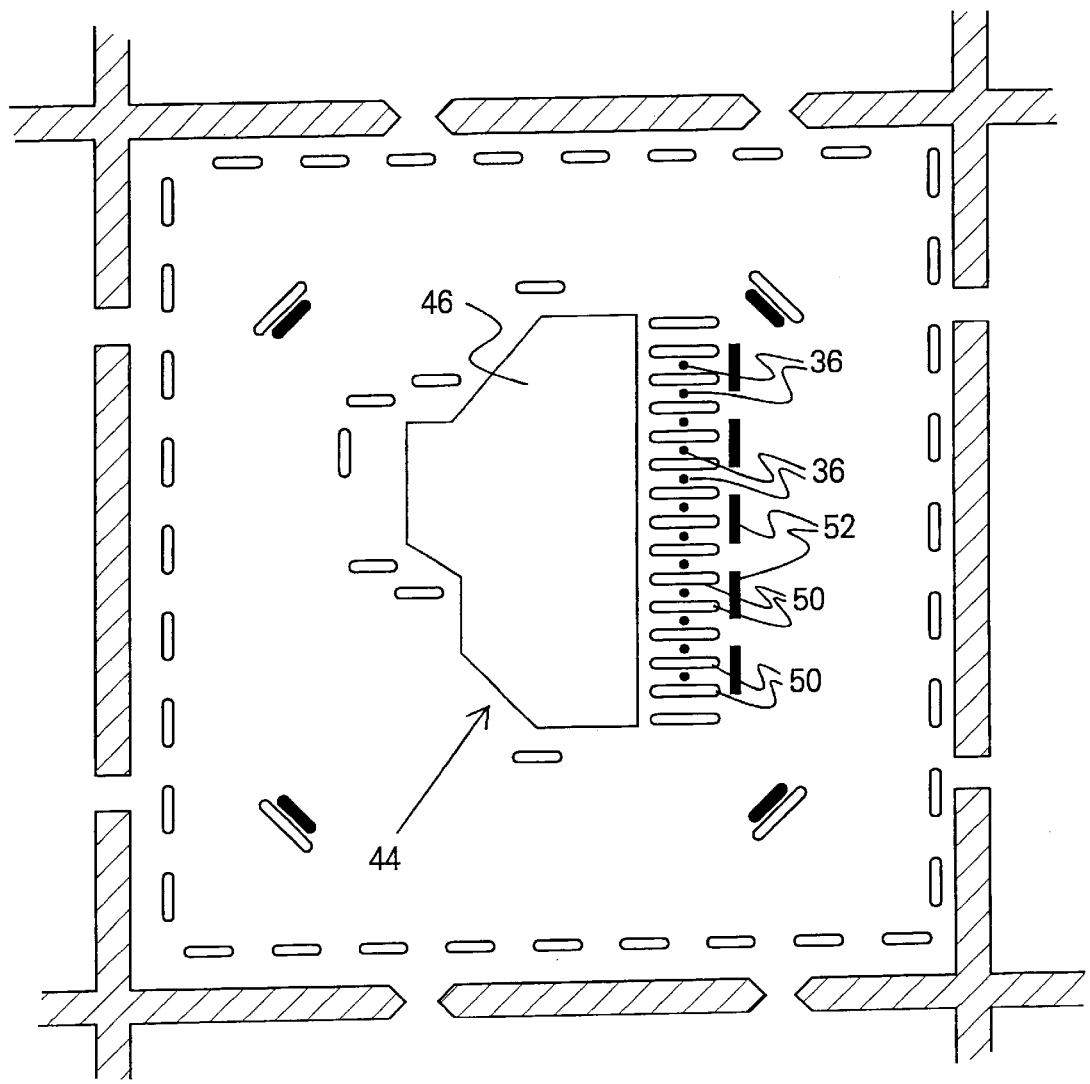
FIG. 2a is an enlarged plan view of the orifice plate shown in FIG. 2.

FIG. 2a is an enlargement of a portion of FIG. 2, depicting the printhead 44 in greater detail. The orifice openings 36 are formed around a pillar of photoresist with a carefully controlled overplating process, which helps determine the appropriate nozzle diameter to control drop size and velocity. On each side of each orifice opening 36 are barriers 50 that, when the orifice plate is bonded to the outer barrier layer 28, form walls down to the surface of the substrate 12. These barriers help inhibit adjacent orifice openings from ejecting spurious drops of ink when an orifice opening is energized by preventing direct fluid flow from one orifice opening are to another.

The manifold 46 rises above an ink fill hole (not shown) in the underlying thin film substrate 12 and extends to the orifice openings 36, allowing ink to flow easily for maximum print rate. Slots 52 are positioned just outside the ends of the barriers 50 to act as fluid flow shock absorbers, preventing fluid flow pulses from ejecting ink from other orifice openings 36 and venting any gas bubbles that might be ingested during collapse lapse of the main vapor bubble. Ink is expelled through the various orifice openings 36 in a manner so as to form alphanumeric characters and area fill, as needed. Additional structural features are shown in FIGS. 2 and 2a, but these are not germane to the nickel orifice plate 32 that is the focus here. Further details of this printhead 44 are found in Gary L. Siewell et al, "The ThinkJet Orifice Plate: A Part With Many Functions", *Hewlett-Packard Journal*, pp. 33–37 (May 1985).

In accordance with the teachings of the embodiments herein, an ink jet ink composition is provided that has an exceedingly fast dry time and further evidences reduced puddling when used with a nickel orifice plate 32, such as described above and shown in the Figures.

The ink composition comprises a vehicle and at least one dye. The vehicle comprises a range of about 10 to 90 wt % organic co-solvents, based on the total ink composition, and the balance water. In particular, the ink comprises the following formulation:

| 1,2-hexanediol and/or 1,2-pentanediol | 5 to 10 wt % |
|---|---|
| 2-pyrrolidone | 15 to 32 wt % |
| humectant(s) | 15 to 37 wt % |
| dye | 0.5 to 10 wt % |
| other components | 0 to 3 wt % |
| water | balance. |

The 1,2-hexanediol and/or 1,2-pentanediol is used as a drying agent, and is more effective than simply adding increased amounts of surfactants. While it is known that surfactants can decrease dry time of the ink, surfactants can also enhance the toxicity of other chemical components and exacerbate puddling of the ink on the nickel orifice plate.

The humectant comprises any of the humectants commonly employed in ink jet printing. Organic solvents suitably employed in the present invention include, but are not limited to, glycols, such as ethylene glycol, diethylene glycol, triethylene glycol and tetraethylene glycol; glycerol and related derivatives such as polyethoxylated glycerols; lactams, such as N-methyl pyrrolidone; lactones, such as butyrolactone; alkanolamines, such as diethanolamine and triethanolamine; diols such as 1,2-propanediol, 1,3-propanediol, 1,2-butanediol, 2,3-butanediol, 1,4-butanediol, and hexylene glycol (2-methyl-2,4-pentanediol); other isomers of pentanediol and hexanediol such as 1,5-pentanediol and 1,6-hexanediol; triols, such as 1,2,6-hexanetriol; mono- and di-glycol ethers, such as ethylene glycol monobutyl ether; imidazoles, such as 1,3-dimethyl-2-imidazolidinone; sulfones, such as dimethylsulfone, tetramethylene sulfone, and 2,2'-sulfonyldiethanol; organosulfoxides, such as methylsulfoxide; organosulfides, such as 2,2'-thiodiethanol; trimethylolpropane; triethylolethane; urea and its derivatives; and the like and mixtures thereof.

The dye is any water- or organic-soluble black, red, blue, green, orange, pink, yellow or other color. Examples include, but are not limited to, (1) black: Food Black 2, Carta Black; direct black 168, carboxylated Food Black 286, and carboxylated Food Black 287; (2) red: Direct Red 9, Direct Red 227, and Acid Red 52; (3) yellow: Acid Yellow 23 and Direct Yellow 86; (4) blue: Acid Blue 9, Acid Blue 185, Direct Blue 86, Direct Blue 199, and FD&C Blue 1; and (5) orange: Acid Orange 7.

These dyes are all anionic dyes, and are ordinarily supplied from the dye maker with sodium counterions. The sodium counterions may be replaced with lithium, potassium, tetramethyl amine (tetramethyl ammonium), triethanol amine (triethanol ammonium), or diethylene amine cations, as disclosed, for example, in U.S. Pat. Nos. 4,685,968; 4,761,180; 4,786,327; and 4,810,292. The counterion replacement may be performed by reverse osmosis, such as disclosed and claimed in U.S. Pat. No. 4,685,968, or by ion exchange, such as disclosed and claimed in U.S. Pat. No. 4,786,327.

Up to a total of about 3 wt % of other components, including buffers, corrosion inhibitors, surfactants, biocides, polymers, pigments, and binders, based on the total ink composition, may be included in the ink. An example of a buffer is 4-morpholinepropanesulfonic acid (MOPS), which is used within the range of about 0.1 to 1 wt %.

While one or more surfactants may be present in the ink, the concentration of such surfactant(s) is 0.1 wt % or less, based on the total ink composition. It is well known in the art that surfactants have been used quite effectively to mitigate puddling on nozzle plates used in inkjet. It was therefore surprising to discover that incorporation of moderate levels of surfactants into the present ink formulations greatly exacerbated puddling on the nickel nozzle plate during operation. It is known that previous ink and surfactant formulations known in the art were designed to be used on different materials, namely Kapton (an organic polymer-based material) and coated nickel. In the case of the latter, the nickel orifice plate is top-coated with a noble metal like gold or palladium. Thus, these solutions were designed for materials with very different surface properties than nickel, whose surface is covered with a dense oxide layer. Additionally, the worsened puddling performance is due to the fact that the diameter of the orifice openings 36 in the nickel orifice plate 32 is on the order of 49 to 61 $\mu$m, rather than the more conventional printer nozzle orifices, which are on the order of 20 to 30 $\mu$m. The utilization of larger orifices does not support the lower surface tension of an ink containing more than 0.1 wt % surfactant. In this connection, the surface tension of the present inks is in the range of 36 to 44 dyne/cm, in contrast to the surface tension of more conventional fast-drying ink-jet inks, which is typically in the range of 28 to 32 dyne/cm. Also in this connection, the weight of a droplet fired through the nozzle plate 32 is 150 to 200 ng, compared with the more conventional weight of 15 to 25 ng.

By using surface active solvents such as 1,2-pentanediol and 1,2-hexanediol, a combination of performance is achieved, primarily including proper dry time ($\leq$300 msec), low puddling on the nickel orifice plate, and good frequency response (on the order of about 3 kHz). Finally, by using the 1,2-pentanediol and/or 1,2-hexanediol as the predominant drying agent, typical toxicity issues associated with many common surfactants are avoided. Examples of such common surfactants include the TERGITOLS, SILWETS, DOWFAXES, DOWANOLS, and SURFYNOLS. On the other hand, small amounts of such surfactants, less than about 0.1 wt %, may be included in the ink to inhibit corrosion of the nickel orifice plate. In order to achieve the dry times of the present compositions, however, larger amounts of such surfactants would be required, and such larger amounts would be sufficient to exacerbate toxicity issues and puddling, both of which are undesirable.

The ink composition of the present invention preferably comprises:

| 1,2-hexanediol | about 6 wt % |
|---|---|
| 2-pyrrolidone | about 25 wt % |
| diethylene glycol or ethylene glycol | about 25 wt % |
| dye | about 2 to 6 wt % |
| water | balance. |

EXAMPLES

Example 1

An ink composition was prepared in accordance with the foregoing teachings comprising:

| 1,2-hexanediol | 9 wt % |
|---|---|
| 2-pyrrolidone | 32 wt % |
| ethylene glycol | 22 wt % |
| Food Black 2, TMA salt | 4.1 wt % |
| MOPS | 0.3 wt % |
| water | balance. |

The ink composition was loaded into the reservoir of a print cartridge provided with a reticulated foam and having a printhead such as shown in FIG. 1, with a nickel orifice plate. The print cartridge was placed in a POS ink jet printer operating at a frequency of 3 kHz. The print medium was thermal mechanical pulp receipt paper.

The pen was printed to ink-out (approximately 5 million 9-point font characters. Minimal ink puddling was present on the orifice plate, and no ink puddle reached the pen electrical interconnect below the nozzle plate. The resulting dry time was measured by mounting a small horsehair brush 1.0 inches behind the pen such that the brush was in contact with the printed medium. The pen was then printed with a carriage speed of 5 inches per second. No ink smearing was present under these conditions, and the dry time was determined to be 200 msec. The print quality during the life of the pen was nearly constant and equivalent to typical dot matrix printer output. The optical density was measured on a calibrated Macbeth optical densitometer, model # RD 917, and found to be 0.55.

Example 2

Another ink composition was prepared in accordance with the foregoing teachings comprising:

| | |
|---|---|
| 1,2-hexanediol | 9 wt % |
| 2-pyrrolidone | 18 wt % |
| ethylene glycol | 22 wt % |
| 1,3-propanediol | 15 wt % |
| Acid Blue 9, Na salt | 2.8 wt % |
| MOPS | 0.3 wt % |
| water | balance. |

The ink composition was printed as in Example 1 and the dry time was measured. The dry time was determined to be ~200 msec.

Example 3

Yet another ink composition was prepared in accordance with the foregoing teachings comprising:

| | |
|---|---|
| 1,2-hexanediol | 7 wt % |
| 2-pyrrolidone | 15 wt % |
| trimethylolpropane | 15 wt % |
| ethylene glycol | 22 wt % |
| Acid Red 52, Na salt | 3.5 wt % |
| MOPS | 0.3 wt % |
| Zonyl FSA | 0.005 wt % |
| water | balance. |

The ink composition was printed as in Example 1 and the dry time was measured. The dry time was determined to be ~300 msec.

Example 4

Still another ink composition was prepared in accordance with the foregoing teachings comprising:

| | |
|---|---|
| 1,2-hexanediol | 10 wt % |
| 2-pyrrolidone | 15 wt % |
| ethylene glycol | 15 wt % |
| Acid Red 52, Na salt | 3.5 wt % |
| MOPS | 0.3 wt % |

-continued

| | |
|---|---|
| Zonyl FSA | 0.005 wt % |
| water | balance. |

The ink composition was printed as in Example 1 and the dry time was measured. The dry time was determined to be ~100 msec.

Comparative Examples 5–8

Several other ink compositions were prepared with similar base vehicles as described in the previous examples, but with the addition of various surfactants. The base vehicle is described below. The ink compositions were printed as in Example 1 and the dry time was measured. Subsequently, the pen was printed to ink-out (approximately 5 million 9-point font characters) and puddling performance was evaluated.

Base vehicle for inks 5–8:

| | |
|---|---|
| 1,2-hexanediol | 9 wt % |
| 2-pyrrolidone | 32 wt % |
| ethylene glycol | 22 wt % |
| Food Black 2, TMA salt | 4.1 wt % |
| MOPS | 0.3 wt % |
| water | balance |

| Example | Surfactant | Concentration | Dry Time | Puddling Performance |
|---|---|---|---|---|
| 5 | Tergitol 15-s-7 | 0.5% | <100 msec | severe; on interconnect |
| 6 | Tergitol 15-s-7 | 0.25% | <100 msec | severe; on interconnect |
| 7 | Surfynol 465 | 0.25% | <100 msec | Severe |
| 8 | Dowfax 8390 | 0.5% | <100 msec | Severe; on interconnect |

It can be seen that in all cases, where the surfactant concentration was 0.25 wt % or greater, the dry time was determined to be <100 msec. In addition, regardless of the type of surfactant, severe ink puddling was present on the nickel orifice plate, and in many cases the ink puddle reached the pen electrical interconnect below the nozzle plate.

INDUSTRIAL APPLICABILITY

The ink jet ink disclosed herein is expected to find use in point-of-sale printers and check validation applications.

What is claimed is:

1. An ink jet ink for thermal ink jet printers, wherein said printers employ a printhead having a nickel orifice plate through which droplets of said ink are expelled onto a print medium, said ink jet ink comprising:
   (a) a vehicle comprising
      (i) 5 to 10 wt % of a drying agent selected from the group consisting of 1,2-hexanediol and 1,2-pentanediol,
      (ii) 15 to 32 wt % 2-pyrrolidone,
      (iii) 15 to 37 wt % of at least one humectant, and
      (iv) the balance water;
   (b) 0.5 to 10 wt % of a dye; and (c) 0 to 3 wt % comprising at least one component selected from the group consisting of buffers, corrosion inhibitors, surfactants, biocides, polymers, and binders, with the proviso that the total amount of surfactants is 0.1 wt % or less, based on the total ink composition.

2. The ink jet ink of claim 1 wherein said drying agent comprises 1,2-hexanediol.

3. The ink jet ink of claim 1 wherein said vehicle comprises about 6 wt % of said drying agent, about 25 wt % of said 2-pyrrolidone, and 25 wt % or less of said humectant.

4. The ink jet ink of claim 1 wherein said humectant is selected from the group consisting of glycols; glycerol and related derivatives; lactams; lactones; alkanolamines; diols; other isomers of pentanediol and hexanediol; triols; mono- and di-glycol ethers; imidazoles; sulfones; organosulfoxides; organosulfides; trimethylolpropane; triethylolethane; and urea and its derivatives.

5. The ink jet ink of claim 4 wherein said humectant is selected from the group consisting of ethylene glycol, diethylene glycol, triethylene glycol, tetraethylene glycol, polyethoxylated glycerols, N-methyl pyrrolidone, butyrolactone, diethanolamine, triethanolamine, 1,2-propanediol, 1,3-propanediol, 1,2-butanediol, 2,3-butanediol, 1,4-butanediol, hexylene glycol, 1,5-pentanediol, 1,6-hexanediol, 1,2,6-hexanetriol, ethylene glycol monobutyl ether, 1,3-dimethyl-2-imid-azolidinone, dimethylsulfone, tetramethylene sulfone, 2,2'-sulfonyldiethanol, methylsulfoxide, and 2,2'-thiodiethanol.

6. The ink jet ink of claim 1 wherein said ink has a surface tension of at least 36 dyne/cm.

7. The ink jet ink of claim 6 wherein said ink has a maximum surface tension of about 42 dyne/cm.

8. A method for reducing puddling on a nickel orifice plate in a printhead portion of a print cartridge employed in an ink jet printer, said method comprising:

(a) providing an ink composition comprising
  a vehicle comprising (1) 5 to 10 wt % of a drying agent selected from the group consisting of 1,2-hexanediol and 1,2-pentanediol, (2) 15 to 32 wt % 2-pyrrolidone, (3) 15 to 37 wt % of at least one humectant, and (4) the balance water;
  0.5 to 10 wt % of a dye; and
  0 to 3 wt % comprising at least one component selected from the group consisting of buffers, corrosion inhibitors, surfactants, biocides, polymers, and binders, with the proviso that the total amount of surfactants is 0.1 wt % or less, based on the total ink composition; and (b) jetting said ink composition through orifice openings in said nickel orifice plate onto a print medium.

9. The method of claim 8 wherein said drying agent comprises 1,2-hexanediol.

10. The method of claim 8 wherein said vehicle comprises about 6 wt % of said drying agent, about 25 wt % of said 2-pyrrolidone, and 25 wt % or less of said humectant.

11. The method of claim 8 wherein said humectant is selected from the group consisting of glycols; glycerol and related derivatives; lactams; lactones; alkanolamines; diols; other isomers of pentanediol and hexanediol; triols; mono- and di-glycol ethers; imidazoles; sulfones; organosulfoxides; organosulfides; trimethylolpropane; triethylolethane; and urea and its derivatives.

12. The method of claim 11 wherein said humectant is selected from the group consisting of ethylene glycol, diethylene glycol, triethylene glycol, tetraethylene glycol, polyethoxylated glycerols, N-methyl pyrrolidone, butyrolactone, diethanolamine, triethanolamine, 1,2-propanediol, 1,3-propanediol, 1,2-butanediol, 2,3-butanediol, 1,4-butanediol, hexylene glycol, 1,5-pentanediol, 1,6-hexanediol, 1,2,6-hexanetriol, ethylene glycol monobutyl ether, 1,3-dimethyl-2-imid-azolidinone, dimethylsulfone, tetramethylene sulfone, 2,2'-sulfonyldiethanol, methylsulfoxide, and 2,2'-thiodiethanol.

13. The method of claim 8 wherein said orifice openings are at least 49 μm in diameter.

14. The method of claim 13 wherein said orifice openings have a maximum diameter of about 61 μm.

15. The method of claim 8 wherein said ink has a surface tension of at least 36 dyne/cm.

16. The method of claim 15 wherein said ink has a maximum surface tension of about 42 dyne/cm.

17. In combination, (1) an ink jet ink for a thermal ink jet printer and (2) an orifice plate in a printhead in said printer, through which droplets of said ink are expelled onto a print medium, said ink jet ink comprising:

(a) a vehicle comprising
  (i) 5 to 10 wt % of a drying agent selected from the group consisting of 1,2-hexanediol and 1,2-pentanediol,
  (ii) 15 to 32 wt % 2-pyrrolidone,
  (iii) 15 to 37 wt % of at least one humectant, and
  (iv) the balance water;

(b) 0.5 to 10 wt % of a dye; and (c) 0 to 3 wt % comprising at least one component selected from the group consisting of buffers, corrosion inhibitors, surfactants, biocides, polymers, and binders, with the proviso that the total amount of surfactants is 0.1 wt % or less, based on the total ink composition, and said orifice plate comprising nickel.

18. The combination of claim 17 wherein said drying agent comprises 1,2-hexanediol.

19. The combination of claim 17 wherein said vehicle comprises about 6 wt % of said drying agent, about 25 wt % of said 2-pyrrolidone, and 25 wt % or less of said humectant.

20. The combination of claim 17 wherein said humectant is selected from the group consisting of glycols; glycerol and related derivatives; lactams; lactones; alkanolamines; diols; other isomers of pentanediol and hexanediol; triols; mono- and di-glycol ethers; imidazoles; sulfones; organosulfoxides; organosulfides; trimethylolpropane; triethylolethane; and urea and its derivatives.

21. The combination of claim 20 wherein said humectant is selected from the group consisting of ethylene glycol, diethylene glycol, triethylene glycol, tetraethylene glycol, polyethoxylated glycerols, N-methyl pyrrolidone, butyrolactone, diethanolamine, triethanolamine, 1,2-propanediol, 1,3-propanediol, 1,2-butanediol, 2,3-butanediol, 1,4-butanediol, hexylene glycol, 1,5-pentanediol, 1,6-hexanediol, 1,2,6-hexanetriol, ethylene glycol monobutyl ether, 1,3-dimethyl-2-imid-azolidinone, dimethylsulfone, tetramethylene sulfone, 2,2'-sulfonyldiethanol, methylsulfoxide, and 2,2'-thiodiethanol.

22. The combination of claim 17 wherein said nickel orifice plate has orifice openings that are at least 49 μm in diameter.

23. The combination of claim 22 wherein said orifice openings have a maximum diameter of about 61 μm.

24. The combination of claim 17 wherein said ink has a surface tension of at least 36 dyne/cm.

25. The combination of claim 24 wherein said ink has a maximum surface tension of about 42 dyne/cm.

* * * * *